(12) United States Patent
Kasher

(10) Patent No.: US 7,974,225 B2
(45) Date of Patent: Jul. 5, 2011

(54) PROVIDING EXTENDED RANGE MODES AS PART OF THE 802.11N STANDARD

(75) Inventor: Assaf Kasher, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1070 days.

(21) Appl. No.: 11/755,006

(22) Filed: May 30, 2007

(65) Prior Publication Data

US 2008/0299962 A1 Dec. 4, 2008

(51) Int. Cl.
 *H04B 7/00* (2006.01)
(52) U.S. Cl. .......................................... 370/310
(58) Field of Classification Search .................. None
 See application file for complete search history.

(56) References Cited

U.S. PATENT DOCUMENTS

| 7,664,008 B2* | 2/2010 | Stolpman et al. ............. 370/203 |
| 2006/0182017 A1* | 8/2006 | Hansen et al. ................. 370/208 |
| 2006/0280134 A1* | 12/2006 | Kwon et al. .................... 370/278 |
| 2006/0280154 A1* | 12/2006 | Kwon et al. .................... 370/338 |
| 2007/0076752 A1* | 4/2007 | Zeira et al. .................... 370/466 |
| 2007/0232344 A1* | 10/2007 | Aoki et al. ..................... 455/522 |
| 2007/0298742 A1* | 12/2007 | Ketchum et al. ............ 455/186.1 |
| 2008/0049654 A1* | 2/2008 | Otal et al. ...................... 370/311 |
| 2008/0175265 A1* | 7/2008 | Yonge et al. ................... 370/447 |

OTHER PUBLICATIONS

Fanny Mlinarshy; Title: "802.11n: the next generation in wireless LAN technology". Date: "Mar. 1, 2007"; Publisher: "Cabling installation & maintenance".*

* cited by examiner

*Primary Examiner* — Chi H Pham
*Assistant Examiner* — Fan Ng
(74) *Attorney, Agent, or Firm* — Carrie A. Boone, P.C.

(57) ABSTRACT

An extended range preamble is disclosed, for transmission between extended range 802.11*n* devices. The extended range preamble consists of a high-throughput signal field, in which a modulation coding scheme rate and payload length are specified by the transmitting device. The extended range preamble also includes an expanded preamble, which is adjacent to the high-throughput signal field, and is not understood by non-extended range devices. The modulation coding scheme rate is specified as either one of the rates supported in non-extended range 802.11 devices or as a reserved modulation coding scheme not understood by the non-extended range devices. In either circumstance, the non-extended range device respects the preamble, and thus does not itself attempt a transmission during processing of the preamble.

14 Claims, 4 Drawing Sheets mixed mode preamble (20):

Green Field preamble (30):

PROVIDING EXTENDED RANGE MODES AS PART OF THE 802.11N STANDARD

TECHNICAL FIELD

This application relates to wireless transmission under the 802.11n standard and, more particularly, to supporting extended range transmissions in the presence of legacy wireless devices.

BACKGROUND

The Institute of Electrical and Electronics Engineers (IEEE) has adopted a set of standards for wireless local area networks (LANs), known as 802.11. Wireless products satisfying 802.11a, 802.11b, and 802.11g are currently on the market, for example.

Recently, an 802.11n standard, known also as the Enhancement for High Throughput wireless standard, has emerged. Under the 802.11n standard, transmitters and receivers each have multiple antennas for transmission and reception of data. As a multiple input, multiple output (MIMO) technology, 802.11n is designed to coordinate multiple simultaneous radio signals, and is expected to support a bandwidth of greater than 100 megabits per second (Mbps). In addition to MIMO, the 802.11n standard includes other features to increase throughput. (The 802.11n D2.0 (TGn) is an official draft of the IEEE Standards Association 802.11 Wireless LAN Working Group, published on Feb. 7, 2007.)

A single basic service set (BSS) of a wireless local area network (LAN) may include an access point (AP) and a number of different stations (STA). The wireless LAN may include a second BSS, a third, and so on. Entities in each BSS may communicate at any of a number of rates (known as the basic rate set). The entities of the BSS (the APs and STAs) communicate using frames, control frames, management frames, or data frames. Generally speaking, frames transmitted at a lower rate will travel farther, e.g., have a longer range.

Some stations may benefit from operating in an extended range, even if the extended range is available only at low rates. Several methods have been suggested to extend the range as part of the 802.11 network. Some of them (the TGn standard) use various techniques to allow the current basic orthogonal frequency division multiplexing (OFDM) structure, which is limited to a rate of 6 Megabits per second (Mbps), to use lower rates. These techniques enable operations in lower signal to noise ratios (SNRs) and thus higher ranges.

Among the techniques suggested for range extensions are: 1) Space Time Block Codes (STBC); 2) low-rate binary convolutional codes (BCC) coding (at ¼ rate); 3) duplicating data in the frequency domain; 4) duplicating data in the time domain; 5) using 128-point fast Fourier transform (FFT) on an 8 microsecond (usec) symbols with 1.6 guard interval to combat larger delay spread. All of these techniques improve the reception of the data part of the packet, but do not improve the acquisition and packet detection.

In the current 802.11a/g/n specifications, detection is performed on an 8 usec signal. Several processes, including automatic gain control (AGC) setting and coarse frequency acquisition, are based on the 8 usec signal, limiting the time allowed for acquisition. The acquisition already limits the performance of range extension methods that exists today (such as STBC), and may limit the performance of multiple-antenna receivers as well.

802.11n devices may operate in one of three modes: legacy, mixed, and Green Field. In the legacy mode, the 802.11n device operates just like an 802.11a, 802.11b, or an 802.11g device. In the mixed mode, the 802.11n device operates either as an 802.11n device or as a legacy (802.11a,b,g) device. In the Green Field mode, the 802.11n device operates only according to the 802.11n standard. The 802.11n device achieves its highest throughput in the Green Field mode.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, an extended range preamble is disclosed, for transmission between extended range 802.11n devices. A method for convincing non-extended range devices to respect the extended range preamble is also disclosed. The extended range preamble consists of a high-throughput signal field, in which a modulation coding scheme rate and payload length are specified by the transmitting device. The extended range preamble also includes an expanded preamble, which is adjacent to the high-throughput signal field. The modulation coding scheme rate is specified as either one of the rates supported in non-extended range 802.11 devices or as a reserved modulation coding scheme not understood by the non-extended range devices. In either circumstance, the non-extended range device respects the preamble, and thus does not itself attempt a transmission during processing of the preamble.

The 802.11n devices that operate in an extended range, known herein as extended range (ER) 802.11n devices, need to be able to coexist with 802.11n devices that do not operate in the extended range, known herein as non-extended range (non-ER) 802.11n devices. In contrast to the ER 802.11n devices, non-extended range 802.11n devices are thus considered one of the "legacy" devices. As used herein, any device referred to as a "legacy device" may include an 802.11a, 802.11b, 802.11g, and/or a non-extended range 802.11n device.

Figure 1:
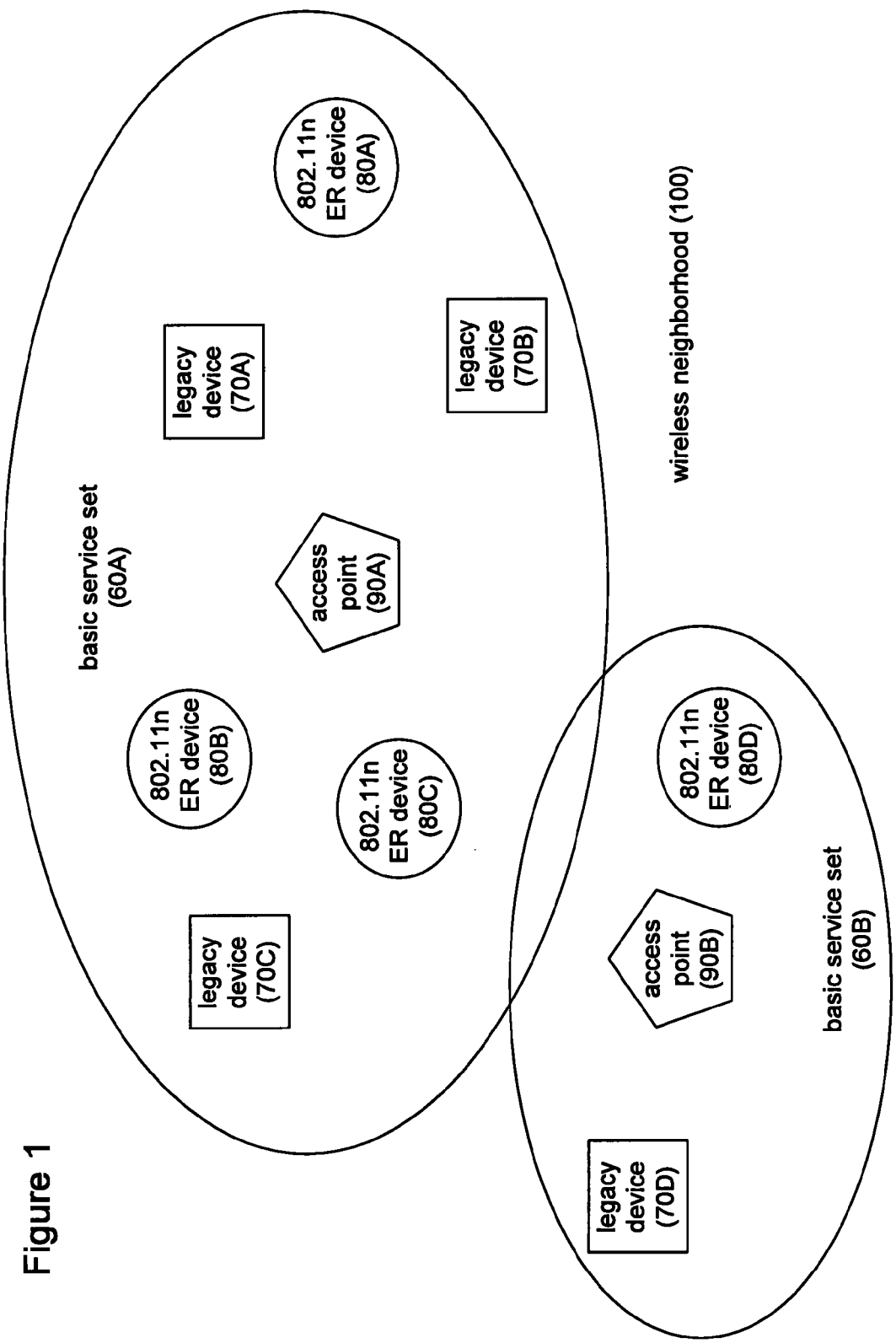
FIG. 1 is a block diagram of a wireless neighborhood, including access points, legacy devices, and 802.11n devices, according to some embodiments.

FIG. 1 is a schematic block diagram of a wireless neighborhood 100, including two partially overlapping basic service sets (BSS) 60A and 60B. Each BSS has a single access point, one or more legacy devices, and/or one or more 802.11n extended range (ER) devices. The BSS 60A includes an access point 90A, legacy devices 70A, 70B, and 70C, and 802.11n ER devices 80A, 80B, and 80C. The BSS 60B includes access point 90B, legacy device 70D, and 802.11n ER device 80D. There is some overlap between BSS 60A and 60B, and the wireless neighborhood 100 may include many such BSSs. The 802.11n devices may be either mixed mode devices or Green Field devices. Collectively, the entities in FIG. 1 may be described herein as access points 90, basic service sets (BSS) 60, legacy devices 70, and ER 802.11n devices 80. The legacy devices 70 may be 802.11a devices, 802.11b devices, 802.11g devices, and/or non-extended range 802.11n devices.

The access points 90 may supply a gateway to another network for the legacy and 802.11n ER devices. For example, the legacy devices 70 or the 802.11n ER devices 80 may access the Internet by going through their respective access points 90. Communication between wireless devices may also occur through the access points 90. Thus, when the ER 802.11n device 80B wishes to communicate with the legacy device 70C, the device 80B may first communicate with the access point 90A. Alternatively, the two devices 80B and 70C may communicate with one another using a direct link setup.

In wireless communication under all 802.11 standards (a/b/g/n), wireless transmissions take place using carrier sense multiple access with collision avoidance (CSMA/CA). There are many ways to avoid collisions. One of them is to listen, and then make a decision about whether to transmit or not. Suppose a wireless device, the 802.11n ER device 80A, for example, desires to transmit to another device in the BSS 60A. Before transmitting, the device 80A listens to determine whether a transmission is already occurring. If so, there may be interference, so the wireless device 80A waits until the airwaves of the wireless neighborhood 100 are uncluttered.

However, the airwaves of the wireless neighborhood 100 may be cluttered with a variety of transmissions, not all of which interfere with a transmission by the wireless device 80A. In determining whether it may transmit or not, the wireless device 80A is searching for a transmission that it "respects." A respected transmission may be one with a very strong energy, as compared to a weaker transmission, which may not be respected, as one example. As used herein, the wireless device "respects" a transmission when the transmission is one that the wireless device recognizes as legitimate. An 802.11n device gives "higher respect" to an 802.11a/b/g/n-compatible transmission than to other transmissions, whether the transmission is an extended range transmission or not.

During communication in the wireless neighborhood 100, a preamble, made up of pre-defined bit sequences, is transmitted through the airwaves. The preamble helps receivers lock onto the signal that follows it. The preamble may be split into multiple parts, and may consist of both short and long training sequences, symbols, and tones. The preamble is part of a packet transmitted between the devices in their respective basic service set (BSS). The preamble ensures that different devices in the wireless LAN recognize one another.

Figure 2A:
FIGS. 2A and 2B are schematic diagrams of a mixed mode preamble and a Green Field preamble, respectively, used for 802.11n communication, according to the prior art.
Figure 2B:
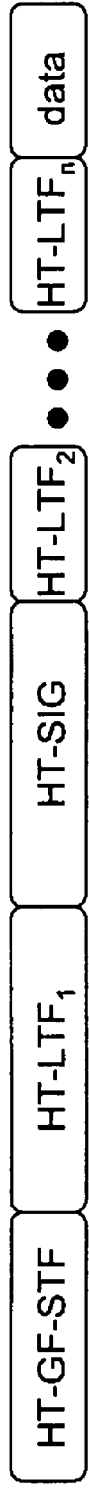

FIGS. 2A and 2B are schematic diagrams of two different preambles 20 and 30 used for 802.11n communications, according to the prior art. The first preamble 20 (FIG. 2A) is for mixed mode transmission, the second preamble 30 (FIG. 2B) is for Green Field transmission.

The mixed mode preamble 20 includes fields for both legacy (802.11a/b/g and non-ER 802.11n) and high-throughput (ER 802.11n) transmission: a legacy short training field (L-STF), a legacy long training field (L-LTF), a legacy signal field (L-SIG), a high-throughput signal field (HT-SIG), a high-throughput short training field (HT-STF), a first high-throughput long training field (HT-LTF$_1$), . . . , an n$^{th}$ high-throughput long training field (HT-LTF$_n$), and data.

The Green Field preamble 30 includes different fields than are found in the mixed-mode preamble 20, with emphasis on its high-throughput transmission capability: a high-throughput Green Field short training field (HT-GF-STF), a first high-throughput long training field (HT-LTF$_1$), a high-throughput signal field (HT-SIG), a second high-throughput long training field (HT-LTF$_2$), . . . , an n$^{th}$ high-throughput long training field (HT-LTF$_n$), and data. The particular meaning and implementation of each field is defined under the 802.11n (draft) wireless standard, and is not further relevant to the inventive concepts, other than as described herein.

In contrast to the preambles 20 and 30, the 802.11n ER wireless device 80 generates either a mixed mode preamble 40 or a Green Field mode preamble 50, having new extended range fields, as described below. The preambles 40 and 50 include fields for extended range transmissions, fields which are not understood by the legacy devices 70. The preambles 40 and 50 are designed so that legacy devices 70, which are not involved in a transmission between two 802.11n ER devices 80, respect the transmission between the 802.11n ER devices 80, and thus do not attempt to transmit during such extended range transmissions.

Figure 3A:
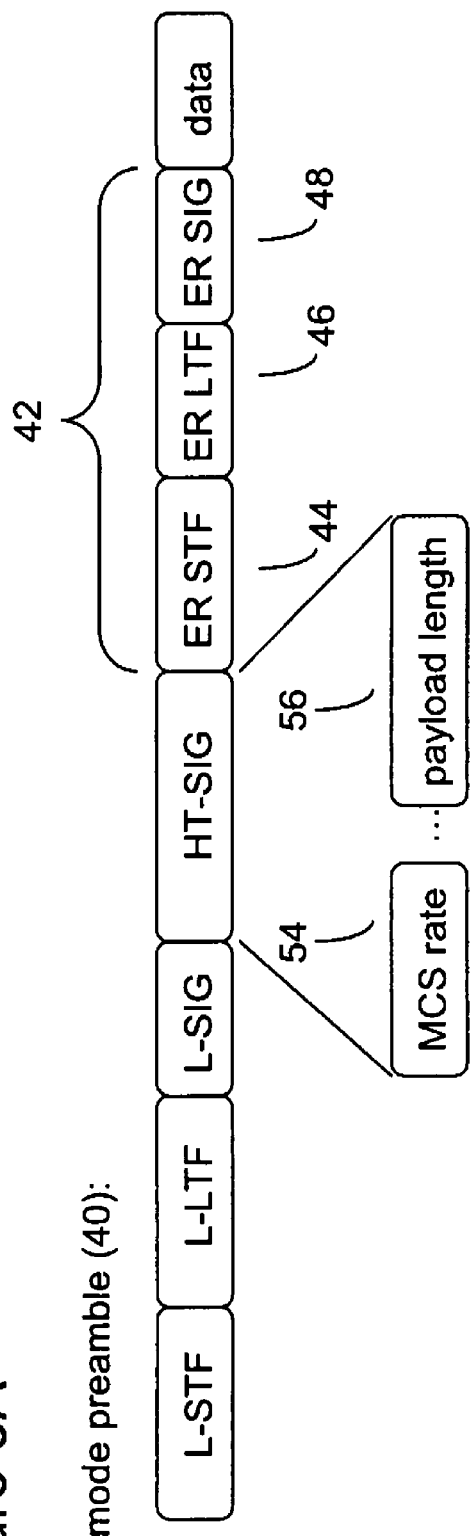
FIGS. 3A and 3B are schematic diagrams of a mixed mode preamble and a Green Field preamble, respectively, used for 802.11n communication, according to some embodiments.
Figure 3B:
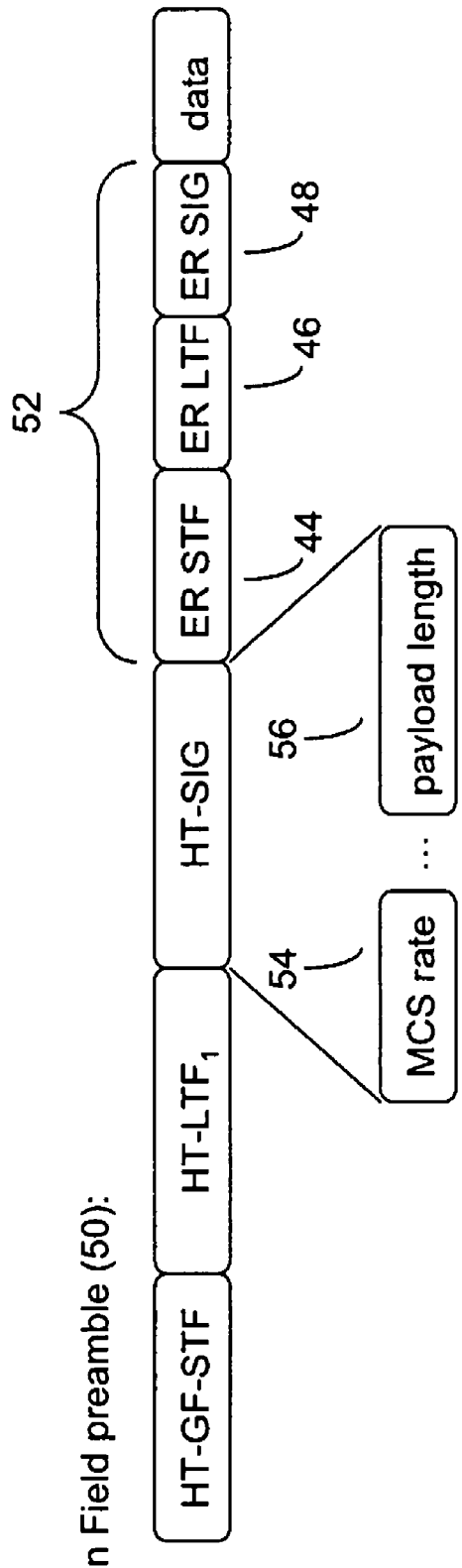

FIGS. 3A and 3B are schematic diagrams of the preambles 40 and 50, respectively, to be used for extended range 802.11n communications, according to some embodiments. The mixed mode preamble 40 (FIG. 3A) is similar to the preamble 20 (FIG. 2A), except that an expanded preamble 42 has been added. Likewise, for the Green Field preamble 50 (FIG. 3B), an expanded preamble 52 has been added to the Green Field preamble 30 (FIG. 2B). The mixed mode preamble 40 and the Green Field preamble 50 are herein known as extended range preambles.

The expanded mixed mode preamble 42 FIG. 3A includes three new fields: an extended range short training field (ER STF) 44, an extended range long training field (ER LTF) 46, and an extended range signal field (ER SIG) 48. Likewise, the expanded Green Field preamble 52 (FIG. 3B) includes the same three new fields: the extended range short training field (ER STF) 44, the extended range long training field (ER LTF) 46, and the extended range signal field (ER SIG) 48. In some embodiments, the new fields 42, 46, and 48 add 24-32 usec of extra preamble to the transmission, which is compatible with 802.11n receivers.

Long preambles have been used in 802.11a/g OFDM products, but in ways that are incompatible with the standard. For example, these prior art preambles may cause interference to devices not supporting the type of preamble or not accepting the rate defined in the preamble, which, according to the standard of the device, may be illegal, whether in the same BSS or in neighboring BSSs.

In some embodiments, the longer preambles 40 and 50 improve acquisition in a way compatible with 802.11n. The longer preamble may use the same format as a preamble according to the 802.11a or the 802.11g standards. Alternatively, the longer preamble may use a different format, such as one used in 802.11b, to improve reception.

The mixed mode preamble 40 and the green field preamble 50 conform to the 802.11n preamble specifications. In some embodiments, the expanded preamble 42 (for the mixed mode preamble 40) and the expanded preamble 52 (for the green field preamble 50) are added after the HT-SIG part of the 802.11n preamble (adjacent to the HT-SIG field). The HT-SIG field is the part of the preamble that indicates the format that is used in the rest of the packet, including payload length, modulation and coding rate, and special options, such as short guard interval and STBC. The fields following the HT-SIG field are no longer present. Thus, the HT-STF, HT-LTF$_1$, . . . , and HT-LTF$_n$ fields are removed from the mixed mode preamble 40 (FIG. 2A), and replaced with the ER STF, the ER LTF, and the ER SIG fields (FIG. 3A). The HT- LTF$_2$, ..., HT-LTF$_n$ fields are removed from the Green Field preamble 50 (FIG. 2B), and replaced with the ER STF, ER LTF, and ER SIG fields (FIG. 3B).

The HT-SIG field in the mixed mode preamble 40 and the Green Field preamble 50 includes a field for specifying the MCS rate. The MCS field 54 is part of the HT-SIG field, as shown in FIGS. 3A and 3B. The MCS field 54 may be used to indicate extended range transmission. In some embodiments, there are two options for indicating the extended range long training field (ER LTF) in a manner that is compatible with the 802.11n standard. First, one of the reserved modulation coding scheme (MCS) rate options may be used to indicate the presence of the ER LTF, as specified in the MCS rate field 54. The 802.11n standard currently uses 77 of 128 possible MCS values.

Thus, for example, the transmitting device may use a reserved MCS rate to indicate the presence of the extended range long training field (ER LTF). With this option, the legacy devices 70 including the non-ER 802.11n devices are unable to determine the length of the incoming communication packet, and will respect the packet if it passes the −62 dBm (milliwatt) power level.

A second option for indicating the extended range long training field (ER LTF) is to use one of the MCS rates already defined in the 802.11n standard, e.g., MCS0, MCS1, . . . , MCS76. In this case, the legacy device 70 may calculate the length of the packet, as follows. The transmitter estimates the number of OFDM symbols that the preamble 40 or 50 has, including data. Using this information, the transmitter specifies the length of the payload in the payload length field 56 (which is also part of the HT-SIG field, along with the MCS rate field 54). The value stored in the payload length field 56, or payload length, is the length of the frame(s) following the extended range preamble. The legacy device 70, noticing the preamble 40 or 50, decodes the HT-SIG field and demodulates the packet as a valid packet, since the L-STF, L-LTF, L-SIG, and HT-SIG fields are recognized as valid in the mixed mode preamble 40 (or the HT-GF-STF, HT-LTF$_1$, and HT-SIG fields are recognized as valid in the Green Field preamble 50). However, the end of the preamble 40 or 50 is different than what the legacy device 70 expects. The legacy device 70 will therefore get an invalid CRC. Nevertheless, the legacy device 70 respects the packet length.

Figure 4:
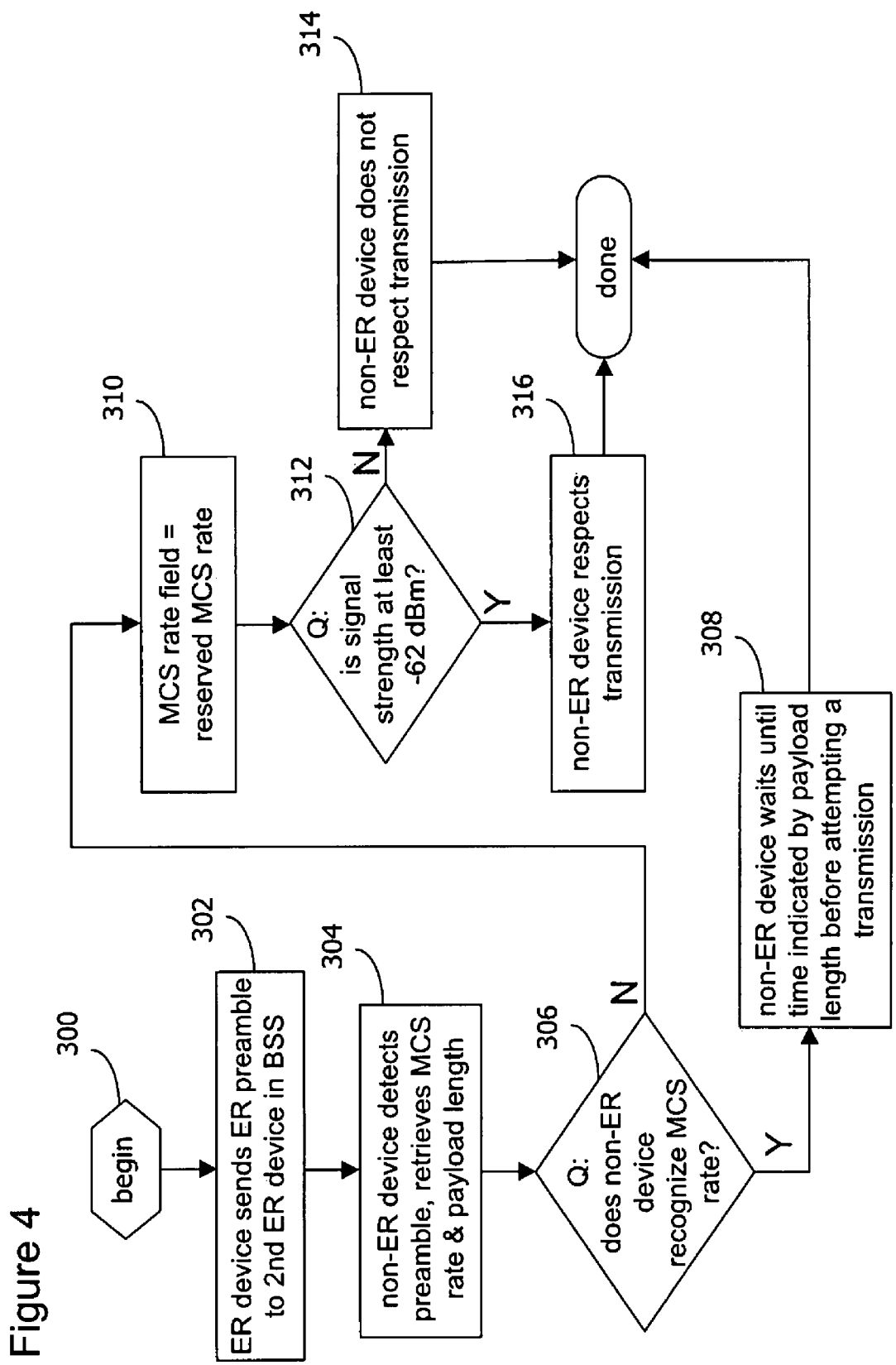
FIG. 4 is a flow diagram of how an 802.11 non-ER device respects the preambles of FIGS. 3A and 3B, according to some embodiments.

FIG. 4 is a flow diagram of a method 300 employed by an 802.11n non-ER (legacy) device 70 sharing the same BSS 60 as two 802.11 ER devices 80, where the latter two devices are transmitting extended range packets, according to some embodiments. The extended range packets may be either a mixed mode packet (FIG. 3A) or a Green Field mode packet (FIG. 3B). With the wireless neighborhood 100 of FIG. 1 as an example BSS, assume that the 802.11 ER device 80C is communicating with the 802.11 ER device 80B in the BSS 60. When the device 80C transmits the preamble, any of the legacy devices 70A, 70B, or 70C inside the BSS 60A may snoop the transaction. (For that matter, the legacy device 70D, outside of the BSS 60A, may also snoop the transaction.)

The method 300 commences with the ER device 80C sending the ER preamble to the ER device 80B (block 302). The non-ER device 70 detects the on-air transmission of a preamble, and retrieves the MCS rate and payload length from the MCS rate field 54 and payload length field 56 of the HT-SIG part of the preamble (block 304). As described above, the MCS rate field may either have a supported MCS rate, which will be recognized by the non-ER device 70, or have a reserved MCS rate, which will not be recognized by the non-ER device. In the first case, the non-ER device 70 recognizes the MCS rate (the "yes" prong of block 306). The non-ER device 70 sees that the preamble includes valid fields, L-STF, L-LTF, L-SIG, and HT-SIG, in the case of the mixed mode preamble 40 or HT-GF-STF, HT-LTF$_1$, and HT-SIG fields, in the case of the Green Field preamble 50. Based on the payload length specified in the preamble, the non-ER device 70 waits the appropriate time before itself attempting a transmission (block 308). At some point, the non-ER device 70 realizes that something is wrong with the transmission (as it calculates an invalid CRC of the preamble). The "waiting" done by the non-ER device 70, however, is of a sufficient length that it is as if the non-ER legacy device "respects" the transmission.

Where the non-ER device 70 does not recognize the MCS rate (the "no" prong of block 306), the MCS rate is one of the reserved rates (block 310). If the signal strength of the transmitted preamble is at least −62 dBm (block 312), the non-ER device 70 nevertheless respects the transmission (block 316), and will not itself initiate a transmission until a period of time has elapsed. Where the signal strength of the preamble is less than −62 dBm, the non-ER device 70 does not respect the transmission (block 314). By gaining the respect of the non-ER legacy device 70, the 802.11n ER device 80C is thus successfully able to transmit to the 802.11n ER device 80B.

Where there are legacy devices 70 and 802.11n devices 80 sharing the same BSS (as in FIG. 1), the same spoofing technique used in the 802.11 L-SIG transmit operation protection can be used to protect the extended range packet.

Beacons are transmitted by the access point 90 at regular intervals, say, every 100 milliseconds, across the BSS 60. Besides being periodic, the beacon indicates the characteristics of the access point 90, so that devices outside the BSS 60 may decide whether to enter the BSS. The devices 70 and 80 already inside the BSS 60 are further provided with information about the access point 90.

To support the extended range, the beacons may be transmitted twice. A first beacon may be transmitted at the mandatory rate (e.g., 6 Mbps under 802.11a/g), which transmits at a certain range, while a second beacon is transmitted at a lower rate (thus, transmitting over an extended range). The first beacon will be recognized by the legacy devices 70 and the 802.11n devices while the second beacon will only be recognized by the 802.11n devices.

While the application has been described with respect to a limited number of embodiments, those skilled in the art will appreciate numerous modifications and variations therefrom. It is intended that the appended claims cover all such modifications and variations as fall within the true spirit and scope of the invention.

I claim:

1. A method, comprising:
   transmitting an extended range preamble by a first extended range 802.11n device to a second extended range 802.11n device, wherein the first and second extended range 802.11n devices are part of a wireless neighborhood, the extended range preamble comprising:
      a high-throughput signal (HT-SIG) field, comprising a modulation coding scheme (MCS) rate field comprising an MCS rate and a payload length field, wherein the MCS rate is one of seventy-seven rates supported under a legacy standard; and
      an expanded preamble; and
   snooping the extended range preamble by a non-extended range device in the wireless neighborhood, wherein the non-extended range device:
      recognizes the MCS rate as being one of the rates supported under the legacy standard;

waits an appropriate time period based on a payload length specified in the payload length field; and calculates an incorrect cyclic redundancy check (CRC) of the extended range preamble, due to the non-extended range device not recognizing the expanded preamble;

wherein the extended range 802.11n device transmits the packet to the second extended range 802.11n device during the processing operations performed by the non-extended range device.

2. The method of claim 1, further comprising:
transmitting the extended range preamble, the expanded preamble therein further comprising:
an expanded range short training field (ER STF);
an expanded range long training field (ER LTF); and
an expanded range signal field (ER SIG).

3. The method of claim 2, further comprising:
transmitting the extended range preamble, wherein the expanded preamble therein is adjacent to the HT-SIG field.

4. The method of claim 1, further comprising:
transmitting the extended range preamble, wherein the expanded preamble therein adds 24 to 36 microseconds of transmission time to the extended range preamble.

5. The method of claim 1, further comprising:
transmitting the extended range preamble, the extended range preamble further comprising:
a high-throughput Green Field short training field (HT-GF-STF); and
a high-throughput long-training field (HT-LTF);
wherein the extended range preamble is a Green Field preamble.

6. The method of claim 1, further comprising:
transmitting the extended range preamble, the extended range preamble further comprising:
a legacy short training field (L-STF);
a legacy long training field (L-LTF); and
a legacy signal field (L-SIG);
wherein the extended range preamble is a mixed mode preamble.

7. A method, comprising:
transmitting an extended range preamble by a first extended range 802.11n device to a second extended range 802.11n device, wherein the first and second extended range 802.11n devices are part of a wireless neighborhood, the extended range preamble comprising:
a high-throughput signal (HT-SIG) field, comprising a modulation coding scheme (MCS) rate field comprising an MCS rate, wherein the MCS rate is a reserved rate not supported under a legacy standard; and
an expanded preamble;
snooping the extended range preamble by a non-extended range device in the wireless neighborhood, wherein the non-extended range device:
determines that the MCS rate is not one of the reserved rates supported under the legacy standard; and
calculates a signal strength of the extended range preamble;
wherein the extended range 802.11n device transmits the packet to the second extended range 802.11n device without interruption of the non-extended range device if the calculated signal strength equals or exceeds −62 dBm.

8. The method of claim 7, further comprising:
transmitting the extended range preamble, the expanded preamble therein further comprising:
an expanded range short training field (ER STF);
an expanded range long training field (ER LTF); and
an expanded range signal field (ER SIG).

9. The method of claim 8, further comprising:
transmitting the extended range preamble, wherein the expanded preamble therein is adjacent to the HT-SIG field.

10. The method of claim 7, further comprising:
transmitting the extended range preamble, wherein the expanded preamble therein adds 24 to 36 microseconds of transmission time to the extended range preamble.

11. The method of claim 7, further comprising:
transmitting the extended range preamble, wherein the HT-SIG field therein further comprises a payload length field to indicate a length of a payload following the extended range preamble.

12. The method of claim 7, further comprising:
transmitting the extended range preamble, the extended range preamble further comprising:
a high-throughput Green Field short training field (HT-GF-STF); and
a high-throughput long-training field (HT-LTF);
wherein the extended range preamble is a Green Field preamble.

13. The method of claim 7, further comprising:
transmitting the extended range preamble, the extended range preamble further comprising:
a legacy short training field (L-STF);
a legacy long training field (L-LTF); and
a legacy signal field (L-SIG);
wherein the extended range preamble is a mixed mode preamble.

14. A method, comprising:
transmitting an extended range preamble by a first extended range device to a second extended range device in a wireless neighborhood, the extended range preamble comprising:
a high-throughput signal field, indicating a modulation coding scheme rate and a payload length; and
an expanded preamble adjacent to the high-throughput signal field;
snooping the extended range preamble by a non-extended range device in the wireless neighborhood, wherein the non-extended range device performs the following processing operations:
either:
recognizing the modulation coding scheme rate as being one of seventy-seven predefined modulation coding schemes; and
waiting a time period as indicated by the payload length before attempting transmission in the wireless neighborhood; and
calculating a cyclic redundancy check of the extended range preamble, wherein the calculated cyclic redundancy check will be wrong; or
recognizing the modulation coding scheme rate as not being one of seventy-seven predefined modulation coding schemes; and
calculating a signal strength of −62 dBm or greater;
wherein the first extended range device completes the transmission to the second extended range device without interruption of the non-extended range device.

* * * * *